United States Patent
Yue (10) Patent No.: US 10,678,817 B2
(45) Date of Patent: Jun. 9, 2020

(54) SYSTEMS AND METHODS OF SCALABLE DISTRIBUTED DATABASES

(71) Applicant: DataJaguar, Inc., Danville, CA (US)

(72) Inventor: Jonathan Zhanjun Yue, Danville, CA (US)

(73) Assignee: DataJaguar, Inc, Danville, CA (US)

( * ) Notice: Subject to any disclaimer, the term of this patent is extended or adjusted under 35 U.S.C. 154(b) by 275 days.

(21) Appl. No.: 15/840,391

(22) Filed: Dec. 13, 2017

(65) Prior Publication Data

US 2018/0225356 A1     Aug. 9, 2018

Related U.S. Application Data

(60) Provisional application No. 62/499,662, filed on Feb. 3, 2017.

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2255* (2019.01); *G06F 16/2379* (2019.01); *G06F 16/27* (2019.01)

(58) Field of Classification Search
CPC .............. G06F 16/285; G06F 16/2379; G06F 16/2255; G06F 16/27; G06F 16/217; G06F 16/2282; G06F 16/00; G06F 17/30; G06F 11/3409; G06F 16/176; G06F 17/30165; G06F 16/24535; G06F 16/93; G06F 16/248; G06F 17/30011; G06F 17/30598; G06F 17/3053; G06F 3/0482; G06F 17/2795; G06F 17/2785; G06F 17/30864; G06F 17/30867; G06F 17/30648; G06F 17/30719; G06F 17/30734; G06F 17/30705; G06F 9/4881; G06F 17/30117; G06F 17/3089;
(Continued)

(56) References Cited

U.S. PATENT DOCUMENTS

6,523,036 B1 * 2/2003 Hickman ................ G06F 16/27
                                                                707/704
7,831,693 B2 * 11/2010 Lai ........................ G06Q 10/10
                                                                706/27
(Continued)

*Primary Examiner* — Anh Ly
(74) *Attorney, Agent, or Firm* — Select Patents; Ashkon Cyrus (57) ABSTRACT

The present disclosure relates to systems and methods that require no data redistribution during a database scaling process. Requiring no data redistribution (also called data migration) can save many hours, or days, or even weeks of overhead during database scaling process. Embodiments of the present disclosure disclose only exchanging control messages among database servers. The control messages may include system configuration information, network topology information, database and table structure information, and any other kind of meta-data information. In the said embodiments, database servers are grouped into clusters. A database server may be a physical computer or a virtual server. Data stored in the existing database servers is not migrated to the new servers. When new database servers are added to the distributed database system, a new cluster is formed to include the new servers.

2 Claims, 6 Drawing Sheets

Existing Cluster: Cluster 1           New Cluster: Cluster 3

(51) Int. Cl.
*G06F 16/27* (2019.01)
*G06F 16/22* (2019.01)
*G06F 16/23* (2019.01)

(58) Field of Classification Search
CPC ..... G06F 9/48; H04L 12/44; H04L 2012/644; H04L 45/70; H04L 45/26; H04L 45/46; H04L 45/02
See application file for complete search history.

(56) References Cited

U.S. PATENT DOCUMENTS

| | | | | |
|---|---|---|---|---|
| 8,116,326 | B2* | 2/2012 | Rockel | G06Q 30/04 370/401 |
| 9,298,782 | B2* | 3/2016 | Skrenta | G06F 16/951 |
| 10,089,307 | B2* | 10/2018 | Kousha | G06F 16/00 |
| 2003/0172142 | A1* | 9/2003 | Su | H04L 29/1233 709/223 |
| 2004/0215639 | A1* | 10/2004 | Bamford | G06F 9/5083 |
| 2007/0074198 | A1* | 3/2007 | Gassoway | H04L 67/06 717/168 |
| 2009/0089313 | A1* | 4/2009 | Cooper | G06F 16/217 |
| 2011/0213994 | A1* | 9/2011 | Thereska | G06F 1/3221 713/320 |
| 2013/0290249 | A1* | 10/2013 | Merriman | G06F 16/273 707/610 |
| 2014/0310409 | A1* | 10/2014 | Ohsuga | G06F 11/3065 709/224 |
| 2015/0254257 | A1* | 9/2015 | Kritchko | G06F 16/27 707/634 |
| 2015/0324359 | A1* | 11/2015 | Luo | G06F 16/90344 707/740 |
| 2016/0085839 | A1* | 3/2016 | D'Halluin | G06F 16/278 707/747 |
| 2016/0098455 | A1* | 4/2016 | Curtin | H04L 67/1097 707/738 |
| 2017/0011076 | A1* | 1/2017 | Wang | G06F 9/5083 |
| 2017/0123941 | A1* | 5/2017 | Yubamoto | G06F 11/20 |
| 2017/0249246 | A1* | 8/2017 | Bryant | G06F 12/0261 |
| 2017/0286518 | A1* | 10/2017 | Horowitz | G06F 11/14 |
| 2017/0344618 | A1* | 11/2017 | Horowitz | G06F 16/2365 |
| 2018/0150503 | A1* | 5/2018 | Horii | G06F 11/3065 |
| 2018/0307773 | A1* | 10/2018 | Zhou | G06F 16/2425 |

* cited by examiner

FIG. 6

SYSTEMS AND METHODS OF SCALABLE DISTRIBUTED DATABASES

RELATED APPLICATION

Applicant claims priority of U.S. Provisional Patent Application 62/499,662 filed Feb. 2, 2017, the disclosure of which is hereby incorporated by reference.

FIELD OF THE INVENTION

The present disclosure relates generally to digital data storage and retrieval. More particularly, the present disclosure relates to scalable distributed database systems and methods.

BACKGROUND OF THE INVENTION

Conventional distributed database systems store data in a cluster which typically consists of a plurality of database servers. When the data volume in a database system reaches full capacity or a threshold of the capacity of the database system, new computer servers are introduced and added to the database system to store more data. This process of adding new servers to existing servers and making the new database servers to be able to accept more data is generally referred to as horizontal scaling of a distributed database system.

Horizontal scaling in these conventional distributed database systems requires data redistribution among the database servers. That is, a portion of or all of the data that is already stored in the existing database servers is migrated to one or more of the new database servers. This data-exchange process among the servers is costly, time consuming, and requires resources. When the total data volume is large in the system, the migration may take a long time (in hours or days). The scaling process may cause long downtime in a production system.

SUMMARY OF THE INVENTION

The present disclosure relates to systems and methods that require no data redistribution during a database scaling process.

Requiring no data redistribution (also called data migration) can save many hours, or days, or even weeks of overhead during database scaling process. Embodiments of the present disclosure disclose only exchanging control messages among database servers. The control messages may include system configuration information, network topology information, database and table structure information, and any other kind of meta-data information. In the said embodiments, database servers are grouped into clusters. A database server may be a physical computer or a virtual server. Data stored in the existing database servers is not migrated to the new servers. When new database servers are added to the distributed database system, a new cluster is formed to include the new servers. Initially, the distributed database system may consist of one or a plurality of clusters. Each cluster consists of one server or more than one servers. The existing clusters include and manage the existing database servers. The new cluster includes and manages the new database servers. New data entering the system are stored in the database servers in the new cluster. The existing clusters are still available for data update, data deletion, data search and other operations. The existing clusters may still accept more new data, but new data is primarily accepted by the new cluster. Accepting data by existing clusters is helpful for a smooth transition in the scaling process. The new cluster is available for all data operations including update, delete, search, insert, and other operations. Alternatively, two or more new clusters can be introduced and added to the existing clusters. Hashing, round-bin, or a configurable policy can be used to select the new cluster or a set of new clusters for inserting new data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION OF THE INVENTION

The present disclosure relates to systems and methods that require no data redistribution during a database scaling process.

Embodiments of the present disclosure disclose a distributed database system which logically organizes distributed database servers into clusters. That is, each cluster consists of one or a plurality of database servers. In a normal state of operation of the said distributed database system, one or more server clusters exist to serve requests of adding new data, updating existing data, deleting existing data, searching data, or any other types of operation on the data or metadata in the system. During a scaling process, new servers to be added to the system are logically grouped into a new cluster.

Figure 1:
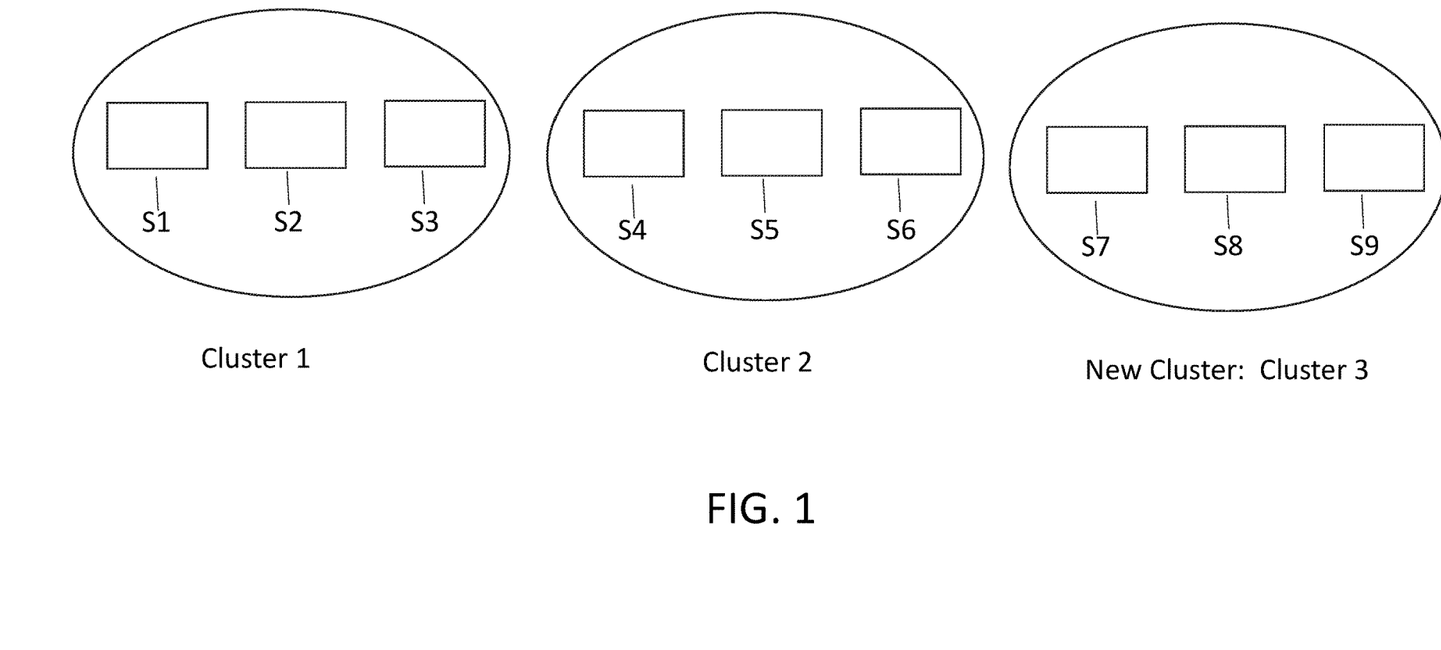
FIG. 1 schematically depicts the existing clusters of database servers and a new cluster incorporating the new database servers according to various embodiments of the present disclosure.

Referring now to the schematic diagram as illustrated in FIG. 1, cluster 1 and cluster 2 represent existing clusters in the distributed database system according to embodiments of the present disclosure. In cluster 1 and cluster 2 there are a plurality of existing database servers (S1, S2, S3, S4, S5, and S6). Cluster 3 represents a new cluster which contains newly added database servers: S7, S7 and S8. In these embodiments, the number of database servers in any cluster is not fixed and can be any number greater than zero. All of the servers are inter-connected with network communication lines such as Ethernet, Infiniband, WiFi, GPRS, 5G and they can send data to and receive data from other servers in the distributed database system.

Figure 2:
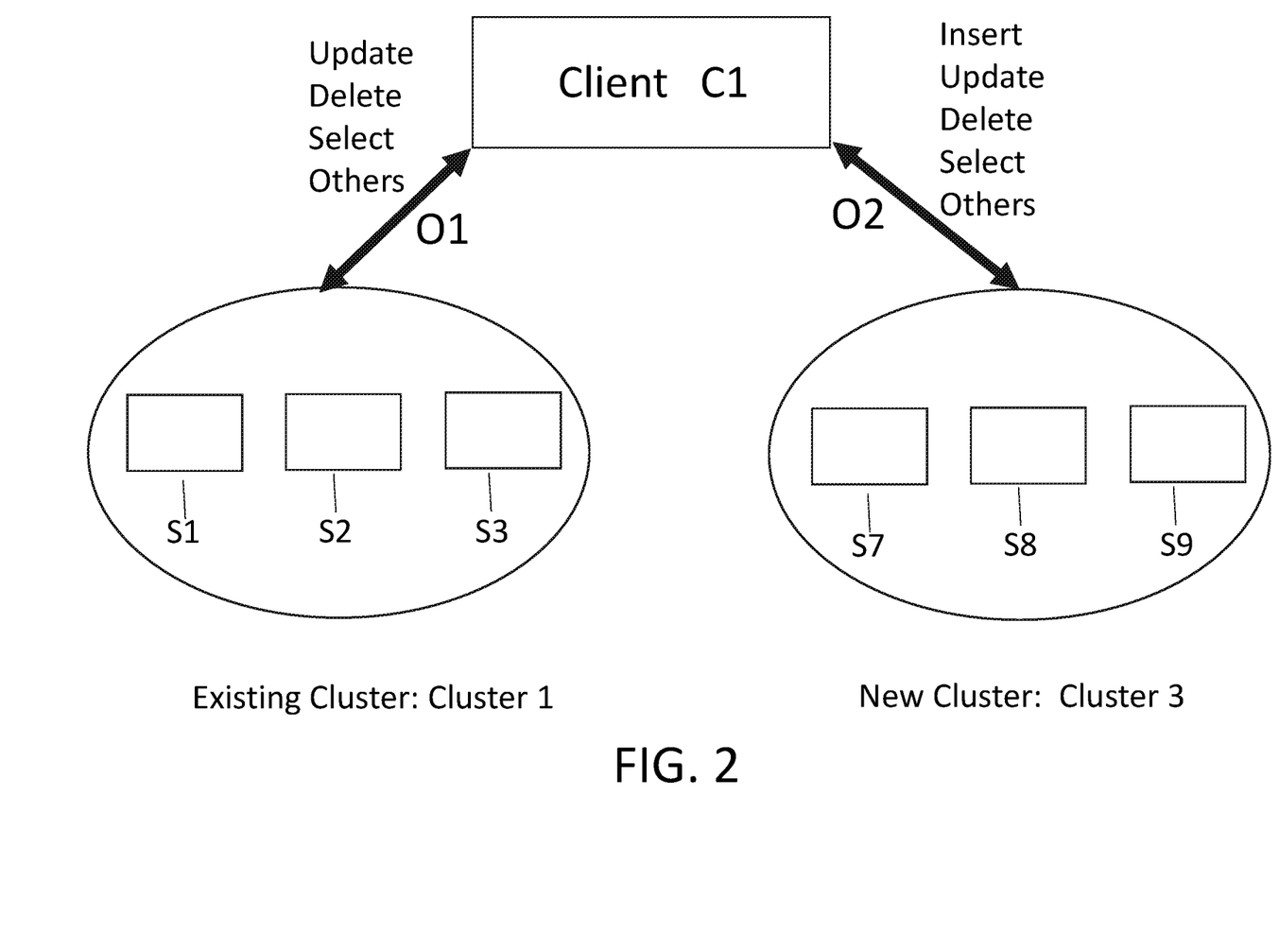
FIG. 2 illustrates operations on database records by a database client according to various embodiments of the present disclosure.

FIG. 2 is a diagram illustrating different operations on database records in the existing cluster and the new cluster according to embodiments of the present disclosure. A client computer makes connections to the database servers in an existing cluster (Cluster 1) and a new cluster (Cluster 3). The client computer can be an external computer outside of the clusters or an internal computer server inside the clusters, such as a computer host, a desktop PC, a laptop PC, a smart phone, or a mobile device. To any server in the new cluster (Cluster 3), insert operation, update operation, delete operation, select operation, and any other operation on data records or meta-data records can be performed. Meta-data information includes database schema information, server configuration information, or any other system or network related information about the system. The insert operation means adding new data to the system. The update operation means updating data in the system. The delete operation means deleting data in the system. The select operation means searching or reading data from the system.

According to certain embodiments of the present disclosure, to any server in the existing cluster (Cluster 1), all the operations that are allowed in new cluster (Cluster 3) are allowed, except the insert operation. In some situations, the insert operation can be performed in the existing clusters. For example, there could be a situation where many data records are deleted in one or more existing clusters and the storage space on these clusters becomes available again to store new data. In such a situation, according to an embodiment, the system can be configured such that these clusters can be available to insert new data. This information can be provided in the control messages (in the switches), and the system will know which clusters to use for inserting new data records. In practice, the servers in the new cluster accept most of, if not all, new database records.

In embodiments of the present disclosure, information about the clusters are stored, updated, and managed by one or more database switches. The one or more database switches store the number of clusters in the current system, attributes of each cluster, attributes of each member server in each cluster, and other related information. The attributes of a cluster include flags showing whether the cluster is a new cluster or an existing cluster, timestamp or a range of timestamps recording stored database records, the number of member servers in the cluster, total storage capacity, sequence number of the cluster in the system, allowed operations to the cluster, specification of the server managing meta-data information, and any other information about the cluster. The attributes of a database server include the server storage capacity, sequence number of the server in the cluster, flags indicating whether it can manage meta-data information, hardware specification, and any other information about the server.

Figure 3:
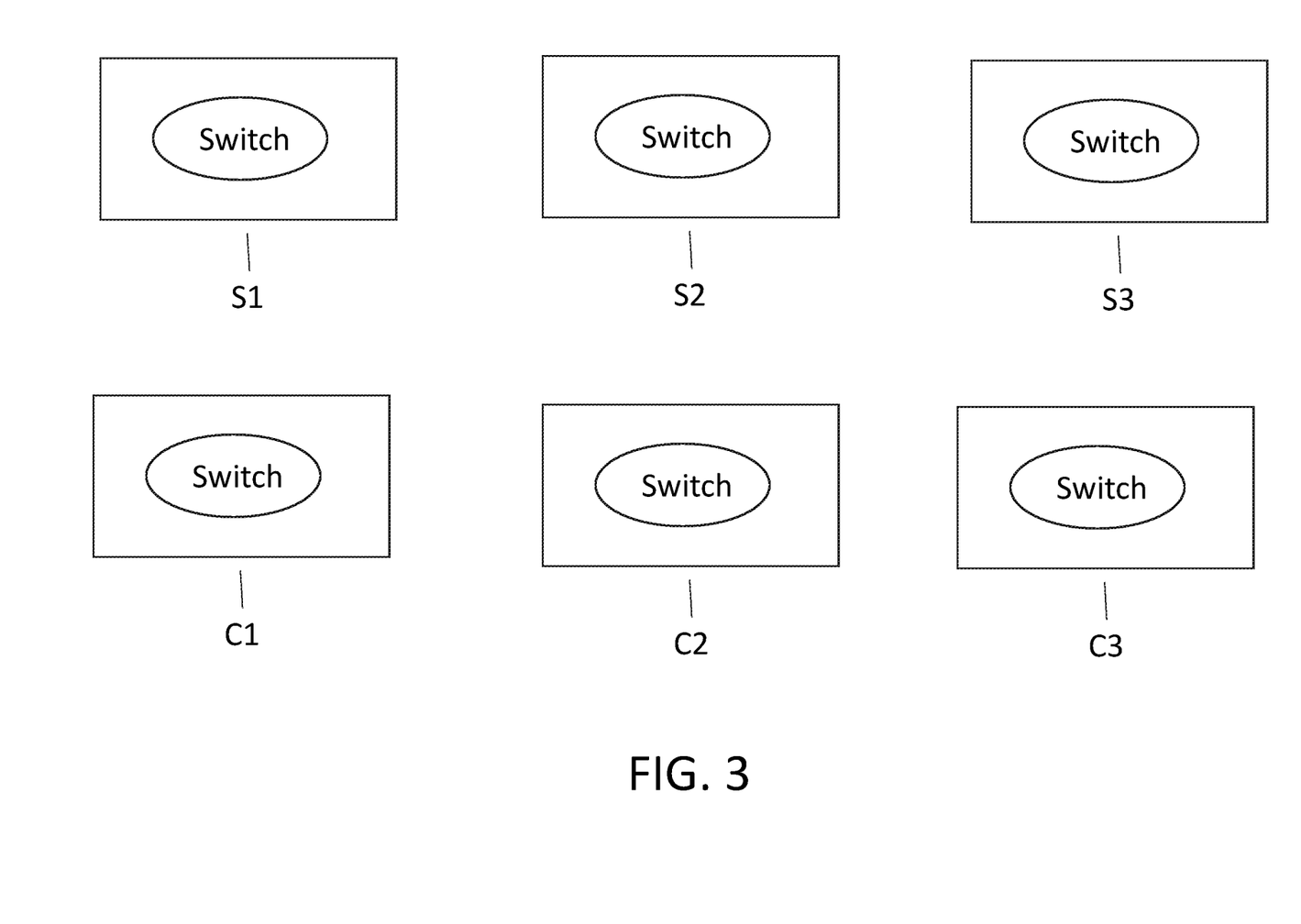
FIG. 3 depicts the database switch in selecting database clusters for a client request according to various embodiments of the present disclosure.

FIG. 3 schematically demonstrates that the database switches are embedded in any database server or database client according to embodiments of the present disclosure. The information in all the switches is updated and synchronized when the new database servers are added to or removed from the system. The information stored in the switch is retrieved from one or more servers when the client is connected to the servers and may be synchronized by exchanging messages among all servers and the client. In another embodiment of the present invention, an independent switch is maintained outside of any server or client. The servers and clients first make network connection to the independent switch and then request for its managed information.

Figure 4:
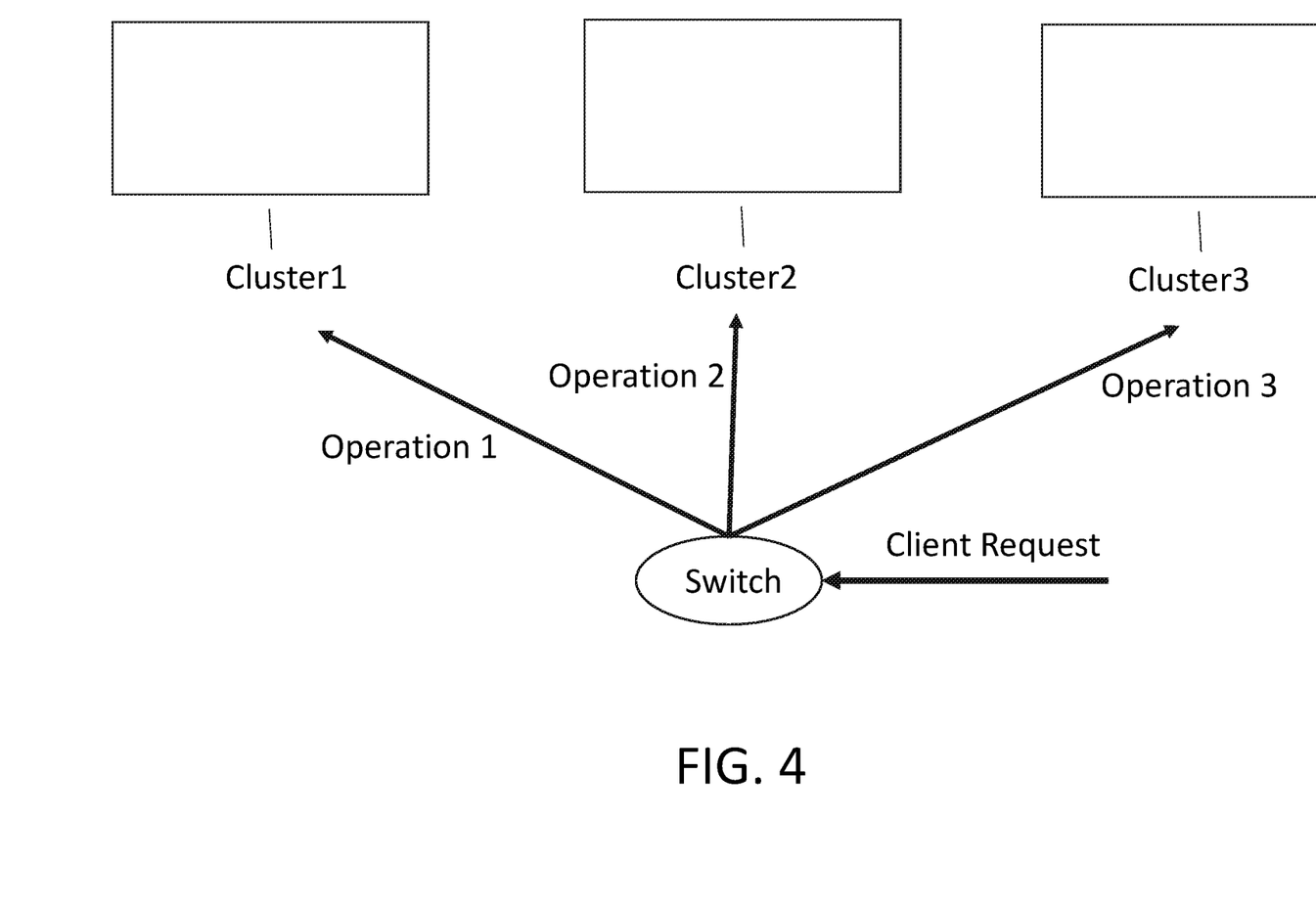
FIG. 4 illustrates selected database clusters receiving operations on database records according to various embodiments of the present disclosure.

FIG. 4 illustrates that the database switches are used to route client requests to only selected clusters or all clusters in the distributed database system according to embodiments of the present disclosure. If the client request contains temporal data records, the switches may look up the timestamp ranges of the clusters and route the request to the clusters that satisfy the temporal conditions. For example, the client may request for records that are generated in the year 2017, then only the clusters that have stored the data of year 2017 need to be queried. Any other condition may be used so that only a few clusters need to be consulted for relevant data records. In the worst case, all the clusters are consulted in parallel (simultaneously), then result is transmitted back to the client. A client request may be any type of operation including the select, update, insert, delete, and other operations. In one obvious decision, insert operations are routed to the new cluster only. The criteria of selecting clusters can be based on the keys, primary key or keys, index keys, or other information of a database record. For operations that are performed on a single record, a single cluster may be selected. For operations that affect multiple records, a plurality of clusters may be selected. Minimal number of clusters are desired to satisfy a client request, so that the total system cost is reduced.

Once the clusters are selected by the switch for an operation, database servers need to be selected in the clusters for accepting the operation. In one embodiment of the present disclosure, all the servers in a cluster may be selected. In another embodiment of the present disclosure, a single server or a plurality of servers are selected for an operation. Selecting servers can be based on hash values of database keys, ranges of keys, or any other criteria of the keys. Only selected servers receive operation commands.

Figure 5:
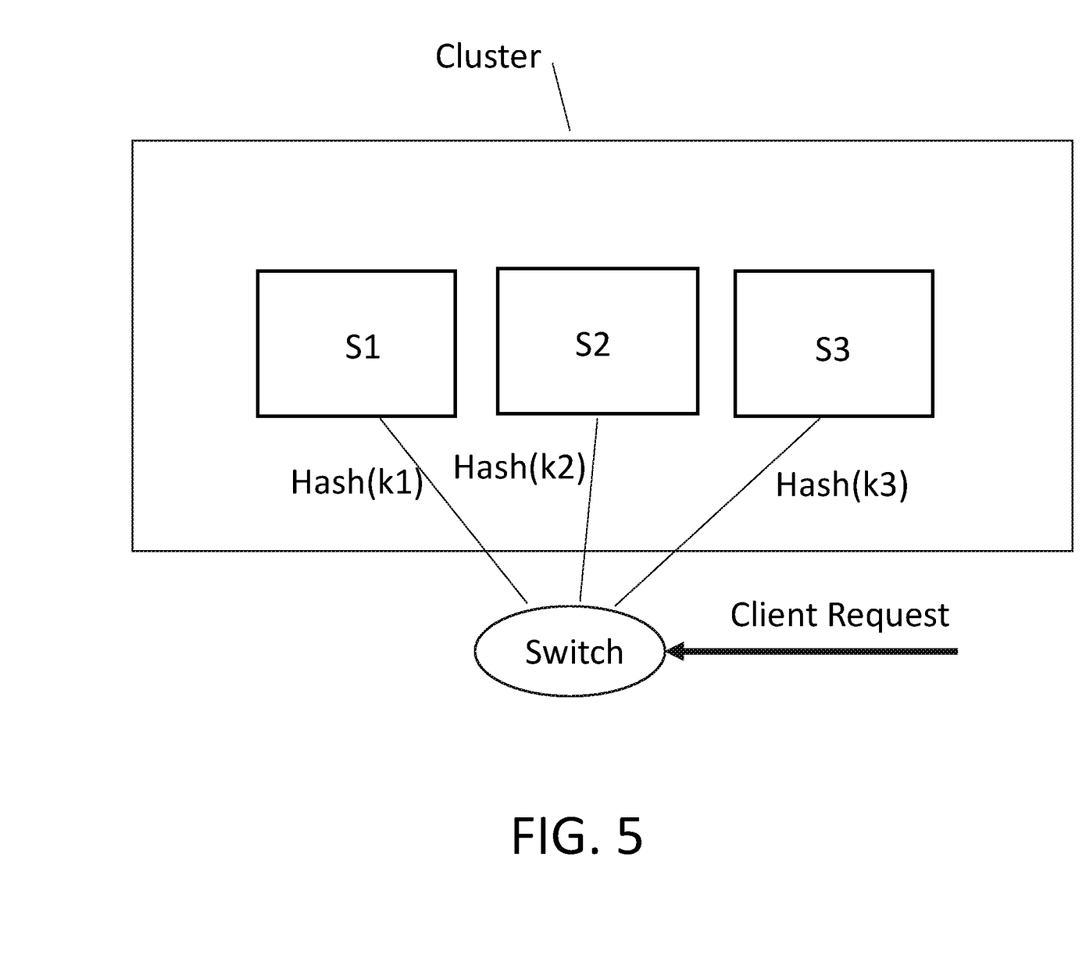
FIG. 5 depicts one embodiment of database record access with hash method.

FIG. 5 schematically depicts selecting database servers in a cluster using the hash code of a database key or composite keys according to embodiments of the present disclosure. When a new record enters the database system, the keys of the records are extracted and are hashed to an integer value corresponding to one of the database servers in the cluster. An initial hash code of the keys is computed and then the modulo value of the code with the number of servers in the cluster is obtained. The modulo value is mapped to one of the servers. The new record is stored in the server determined by the modulo hash code. Normally new data records are stored in the new cluster. At any moment in time, usually there is only one new cluster in the system. When selecting a record with a key, several or all clusters may be consulted in parallel but only one server in each cluster is queried to retrieve the record of the same key. Inside a database server, the records and keys can be managed by any type of record-management subsystem including B+Tree indexes, LSM Tree indexes, SEA array indexes, any other indexing system, or simply flat files without any indexes. The database server may be any software or hardware running data management service. Selecting a database server for updating records and deleting records are performed similarly to selecting records.

Figure 6:
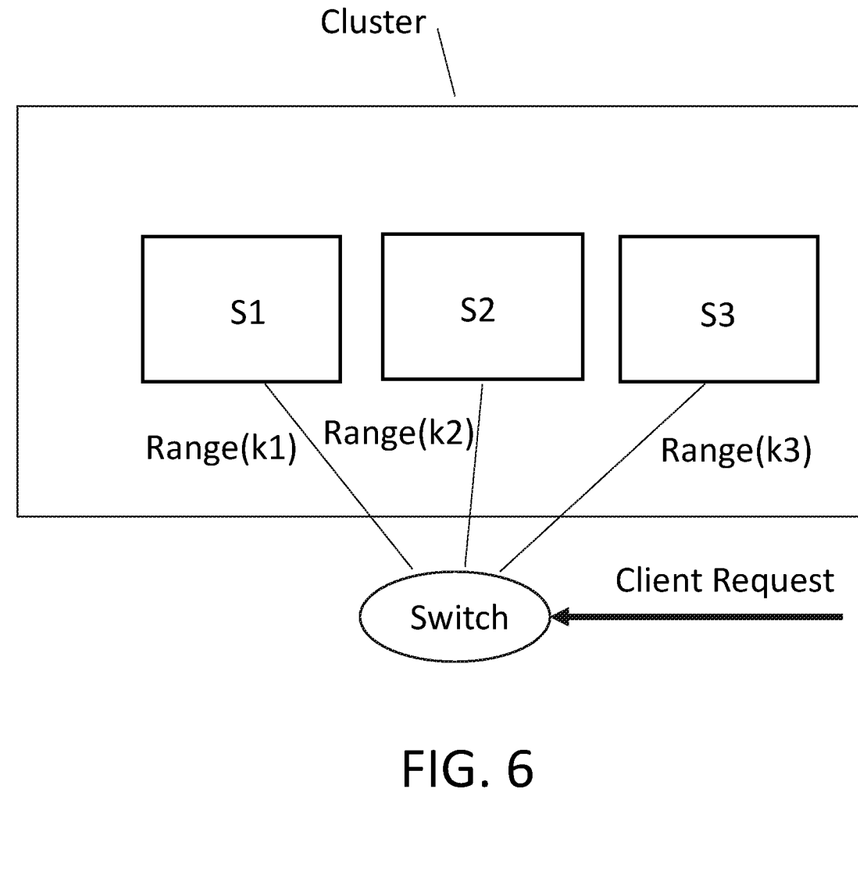
FIG. 6 depicts another embodiment of database record access with range method.

FIG. 6 schematically depicts selecting database servers in a cluster using key range of database key or composite keys. When a new record enters the database system, the keys are extracted from the records and are compared to key ranges of all the database servers in the cluster. The key ranges are managed by the database switch. The new record is stored in the server whose key range covers the key in the new record. When selecting a record with a key, several or all clusters are consulted in parallel but only one server in each cluster is queried to retrieve the record of the same key by the key range lookup. Selecting a server for updating records and deleting records are performed similarly to selecting records. In addition to the hash based and key range based methods, any other computing method can be used to select a server for a database key in the cluster. The selected server is responsible for storing, updating, deleting, and selecting database records in its local storage.

Any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method of horizontal scaling a distributed database system, the method comprising:
   grouping a plurality of database servers into a plurality of existing clusters, wherein each of the plurality of existing clusters consists of one or more database servers and the database servers further comprise physical computers or virtual servers;
   adding one or more new database servers to the distributed database system, wherein a new cluster is formed to include the one or more new database servers, wherein the new cluster includes and manages the one or more new database servers, and wherein after the new cluster has been formed the insert operation is not allowed in the existing clusters and the new cluster is available for all data operations including update, delete, search, insert, and other operations;
   storing new data entering the distributed database system in the new cluster, wherein only control messages are exchanged among database servers and a plurality of clients, and existing clusters are still available for data update, data deletion, data search and other operations; and wherein there is no data redistribution during the horizontal scaling and wherein there is no data migration to the one or more new database servers, and wherein information about the clusters are stored, updated, and managed by a database switch that stores the numbers of clusters in the distributed database system including attributes of each cluster and attributes of each database server in each cluster and database switch data is in every database server and client, and wherein the database switch is used to route client requests to only selected clusters or all clusters in the distributed database system.

2. The method of claim 1, wherein the switch routes client requests by using a hash code of a database key.

\* \* \* \* \*